United States Patent Office 2,948,494
Patented Aug. 9, 1960

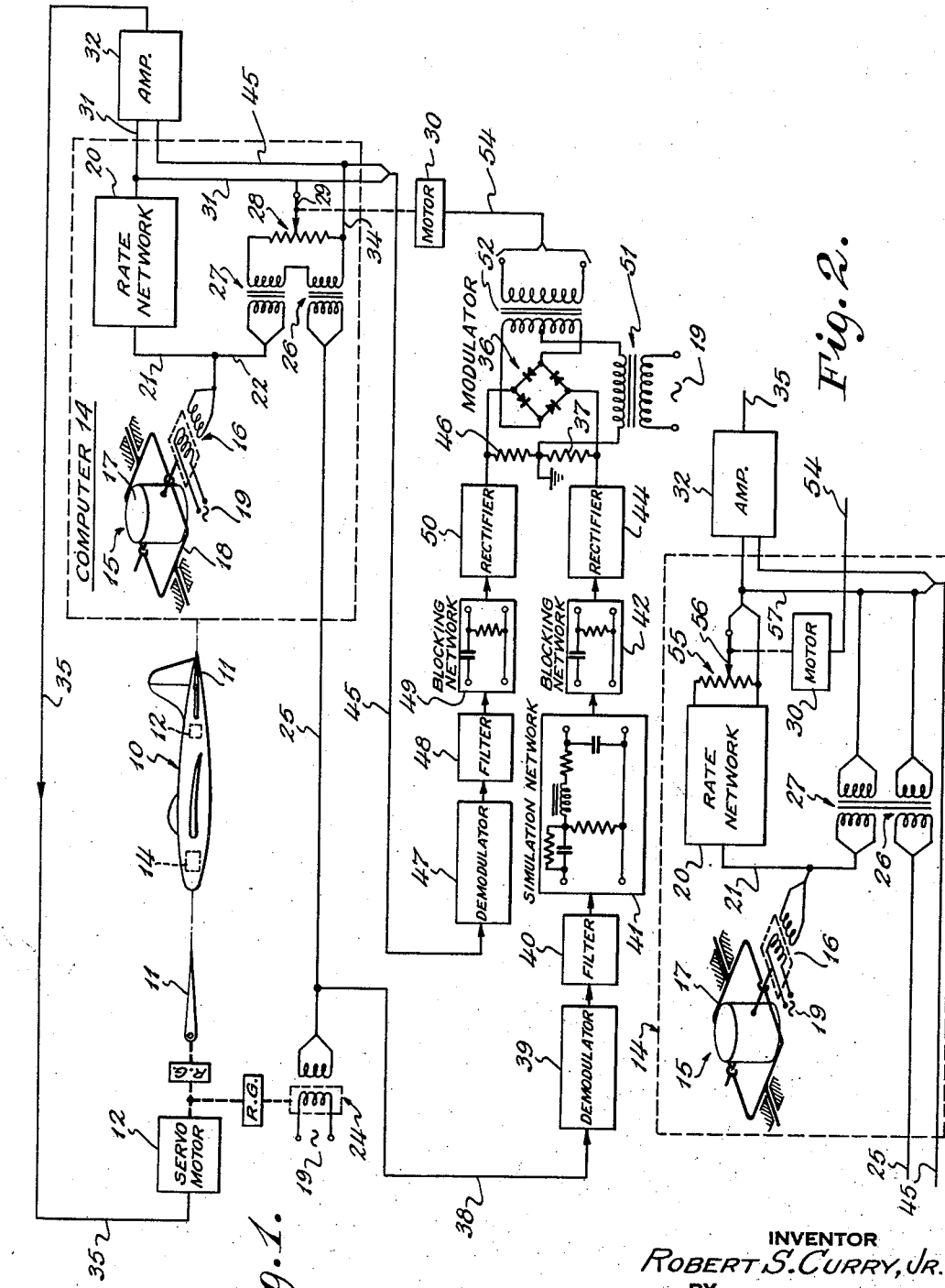

2,948,494
CONTROL SYSTEMS FOR DIRIGIBLE CRAFT
Robert S. Curry, Jr., Baldwin, N.Y., assignor to Sperry Rand Corporation, a corporation of Delaware
Filed Jan. 13, 1954, Ser. No. 403,886
10 Claims. (Cl. 244—77)

This invention relates to control systems that include a missile, craft or aircraft, that is movable about an axis and subject to changeable load conditions. For purposes of the present description, the dirigible craft may be considered to be an aircraft with control surfaces such as elevators responsive to the servomotor of an automatic pilot to control the movements of the craft about its pitch axis. The craft in such a system is required to operate under varying conditions of loading or spring restraint due to causes such as atmospheric pressure changes with the altitude level of the craft, due to variations in the air speed of the craft, and due to change in the inertia of the craft about its pitch axis such as may be caused by consumption of fuel and shift in the locations of cargo and passengers. Wide variations in such flight or operating conditions have been known to alter the performance characteristics of automatic pilot type systems controlling the craft from an over-damped characteristic to one on the verge of instability. In accordance with the present inventive concepts, the system provides for the establishment of a performance standard for the missile or craft therein for a particular load condition thereof. The standard is compared with a measure of the actual performance of the craft or missile in the control system to provide a monitoring output that is utilized to modify the operation of the system to maintain the performance standard for the missile or craft therein for other load conditions thereof.

The primary object of the present invention is to provide a control system that includes an automatically piloted dirigible craft whose overall performance is maintained at an established level for a particular load condition of the craft regardless of load variations in the actual flight or operating conditions of the craft.

One of the features of the invention resides in the establishment of a predetermined operating performance standard for a control system of the character described. The performance standard means of the improved system may include an electrical network as herein shown that simulates the operating characteristics of the craft in the system for the particular load condition of the craft utilized in establishing the performance standard. When considering attitude stabilization of an aircraft operating under the influence of an automatic pilot, the craft moves in rotation about its center of gravity. Mathematically an aircraft with such controls can be represented as a simple spring mass and damping system. The aircraft has incorporated into its basic design inherent values of paddle wheel damping and weathercock spring effect which are required for satisfactory manual flight operation. The automatic pilot adds to the spring effect making it stiffer and thereby less subject to gust disturbances. To achieve proper stability characteristics under these conditions, the automatic pilot also synthesizes additional damping, by proper shaping with respect to time of the restoring moments produced by control surface action. The amount of additional damping used is a function of the attitude response characteristics required.

When an aircraft changes its airspeed, the inherent airframe spring and damping characteristics also change. The spring effect changes directly as the airspeed squared and the damping changes directly with the airspeed. Similarly, the centering force and damping effect on the craft's control surfaces act in like proportions and sense. The restoring moment produced about the center of gravity per degree of control surface deflection also varies directly as the airspeed squared. Thus, an aircraft operating under automatic control, when set to produce good attitude control at low airspeeds or landing conditions, will exhibit very sensitive response to control surface motions at high airspeeds.

The purpose of the present invention is to eliminate the tendency of a control system including an automatically piloted dirigible craft to oscillate with increasing load conditions. This is accomplished by establishing a standard performance characteristic for the craft in the system with which the actual performance of the craft is compared. The output of the computer of the automatic pilot of the craft is modified in accordance with the difference between the compared actual and standard performance characteristics to maintain the performance standard for the craft in the control system for other load conditions thereof. The performance standard for the craft in the system is established in accordance with a particular load condition thereof.

Other objects, features and structural details of the invention will be apparent from the following description when read in connection with the accompanying drawing, in which, Fig. 1 is a schematic view and wiring diagram of a control system embodying the present inventive concepts, and Fig. 2 is a view of the same character as Fig. 1 showing a modified form of a computer unit for the improved control system.

As shown in the drawings, the subject invention relates to a closed loop control system that includes a craft or missile herein represented as aircraft 10. As depicted, the system operates to control the movements of the aircraft 10 about its pitch axis through actuation of the elevator surfaces 11 thereof by automatic pilot means including a suitable servomotor 12 operatively connected thereto by way of suitable shafting and reduction gearing. The load or variable spring restraint on the system is effective through the elevator surfaces 11 of the craft. The craft 10 as subject to the hereinbefore noted changeable load conditions is movable about an axis such as its pitch axis by operation of the servomotor 12 component of the automatic pilot means.

The automatic pilot means for the craft also includes signal means for operating the servomotor 12 in the form of a computer indicated at 14. The computer 14 includes a gyro vertical reference device 15 having an electrical data transmitter, synchro or pick-off 16 providing a signal with departure of the craft from a reference position about its pitch axis. The gyro vertical 15 is mounted on the craft in a conventional manner with the major axis of the rotor case 17 thereof as defined by gimbal ring 18 situated to either correspond with or be parallel to the roll or fore and aft axis of the craft 10. As shown, the pick-off 16 is an electrical data transmitter whose rotor is fixed to the case 17 and whose stator is fixed to the ring 18. The excitation for the pick-off 16 is provided by a suitable source of alternating current electrical energy 19 by suitable connection to the rotor thereof. The described computer means provides a servomotor operating signal with movement of the craft from the reference position determined by the gyro vertical, the pick-off 16 having an output whose amplitude depends on the angular displacement and whose phase or polarity depends on the direction of the displacement of the craft relative to the reference.

The computer 14 of the improved system may also include a suitable means for providing a second operating signal for the servomotor 12 that is in accordance with or proportional to the angular velocity or rate of rotation of the craft 10 from a reference position about its pitch or other axis. In the arrangement shown in the drawings, such means takes the form of a suitable rate network designated at 20. Lead 21 to the network 20 is connected to the output lead 22 from the stator of the pick-off 16. The computer 14 may further include a third operating signal for the servomotor 12 in the form of a repeatback signal providing a measure of the output of the servomotor. As shown in both of the computers 14, this signal is derived from an electrical data transmitter, synchro or pick-off 24 whose rotor is connected by shafting through reduction gearing to the servomotor 12 and elevator surface 11. The excitation for the pick-off 24 is provided from energy source 19. The stator of pick-off 24 is connected by lead 25 to the primary winding of transformer 26 at the computer 14. The signal from pick-off 24 provides a measure of the output of the servomotor 12, the same being proportional to the displacement of elevator surface 11 from a trim condition. The signal of pick-off 16 of the computer appears across the primary winding of transformer 27, being fed thereto by way of lead 22.

In accordance with the present inventive concepts a performance standard is established for the craft in the control system for a particular load condition thereof and the output of the described computing means of the automatic pilot is modified in a manner hereinafter particularly described to maintain the performance standard. The two computer forms of the invention illustrated depict different arrangements for effecting the desired modification of the output of the computing means of the system. As shown in Fig. 1, the modification is accomplished by a combining circuit including the secondary windings of the respective transformers 26 and 27 and a potentiometer 28 whose slider 29 is operatively connected to and positioned by a suitable alternating current drive motor indicated at 30. Lead 31 connects the slider 29 and rate network 20 to provide an input to an amplifier 32. The potentiometer 28 is also connected to the amplifier 32 by way of lead 34. The repeatback signal from pick-off 24 is fed the combining circuit in opposing relation to the signals of the rate network 20 and the reference pick-off 16. The system is closed by the connecting lead 35 between the amplifier 32 and the servomotor 12. The servomotor 12 is consequently driven by the output of amplifier 32, such output depending on the input thereto as determined by the computer 14.

The improved control system further includes a means for providing a signal in accordance with a performance standard for the craft in the system for a particular load condition thereof. Such means is controlled by the output of the servomotor 12 through the repeatback pick-off 24. The performance standard signal is utilized in the system as one of the inputs to a comparing means in the form of a modulator 36. The standard signal appears across the resistance 37 of the modulator 36. Modulator 36 is connected to pick-off 24 by way of lead 38 to lead 25, a demodulator 39 and a filter 40. The demodulator 39 and filter 40 are of conventional types, the same functioning to convert the alternating current output of signal pick-off 24 to a corresponding direct current signal. As herein shown, the resulting direct current signal is then passed through a simulation network indicated at 41. In the improved system, the resistance, capacitance and inductance element of the electrical network 41 are so chosen as to simulate the operating characteristics of the craft in the control system for a particular load condition thereof. In other words, the network 41 modifies the input signal thereto in accordance with the performance of the craft in the control system when performing at the particular or design load condition thereof. It will be understood that the output of the simulation network 41 remains constant as the loading conditions of the craft depart from that associated with the performance standard. The established standard for the system remains constant regardless of the actual performance of the craft therein. As shown, the output of simulation network 41 is fed to a resistance-capacitance couple indicated as a blocking network 42 which eliminates the steady state components of the signal from network 41. The output of the network 42 after rectification in a suitable rectifier 44 appears across the resistor 37 of the comparing modulator 36, as a signal measure of the performance standard of the system.

In accordance with the invention, the performance standard signal appearing across resistor 37 during operation of the system is compared with a signal representative of the actual performance of the craft in the system. Such a signal is obtained from a connection to the automatic pilot computing means of the system by way of leads 45 across the output of the computer 14 to the resistor 46 of the modulator 36 by way of demodulator 47, filter 48, blocking network 49 and rectifier 50. The demodulator 47 and filter 48 provide for the conversion of the alternating current output of the computer 14 to a corresponding direct current signal in the system. The blocking network 49, like network 42, functions to eliminate all steady state components received from the filter 48. The output of the network 49 after rectification by rectifier 50 appears across the resistance 46 of the comparing modulator 36. This signal provides a measure of the actual performance of the object or craft in the system.

The resistors 46, 37 are arranged in balancing relation in the comparing means or modulator 36 and have a common ground connection. Modulator 36, as shown, receives electrical power from the suitable alternating current source 19 by way of transformer 51. The modulator 36 is designed to provide a monitoring alternating current output signal when the respective direct current signals across resistors 46, 37 are of unequal magnitudes and polarities. Such a monitoring signal appears across the secondary winding of an amplifying transformer 52 and is fed to motor 30 by way of lead 54.

The means for modifying the output of the computing means is provided in the system by the potentiometer 28 and the means for adjusting the modifying means is provided by the motor 30 connected to the slider 29 of the potentiometer 28. Motor 30 of the system continues to operate in the system to change the output of the computing means until the signals across resistor 46 and 37 of the comparing means are balanced and the modulator provides a null output.

In the operation of the system, the modulator 36 or comparing means provides a monitoring output to operate motor 30 and thus modify the signal from the computer 14 to amplifier 32 when the compared signals at resistors 46, 37 are out of balance. With the system functioning so that the actual performance of the craft therein matches the standard established for the craft, the signals at resistors 37 and 46 match or balance so that there is no output from the modulator 36 to operate the motor 30. When the craft loading or spring condition is lower than that utilized in establishing the performance standard, the signal output of computer 14 becomes greater than it should so that the signal at resistor 46 increases in magnitude in relation to the standard signal for the system appearing across resistor 37. This results in an unbalance in the comparing means or modulator 36 which then provides a monitoring output that operates motor 30 to move the potentiometer slider 29 thereby modifying the output of the computer to maintain the performance standard for the craft in the control system for lower load or spring conditions. When the craft loading or spring condition is higher than that utilized in establishing the performance standard, the signal output of computer 14 becomes less than it should so that the signal at resistor 46 decreases in magnitude in relation to the standard signal. This results in operation of the motor 30 in the reverse direction so that the signal at resistor 46 is restored to matching relation with the standard signal appearing across resistor 37. The signal of the computing means 14 is correspondingly modified to maintain the performance standard for the craft in the control system for such higher load or spring conditions.

In the form of the computer shown in Fig. 2, the output of the computer 14 of the system is modified by changing the input to amplifier 32 obtained from the rate network 20. In this arrangement, the output of the rate network 20 is fed directly to a potentiometer 55 whose slider 56 is positioned by the motor 30. Lead 57 connects the potentiometer 55, the secondary windings of the transformers 26 and 27 and the amplifier 32. The operation of the motor 30 in the modified control system shown in Fig. 2 is the same as that described in connection with Fig. 1, the output of the computer 14 being adjusted in accordance with a monitoring signal to maintain the performance standard for the craft in the control system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control system including an automatically piloted dirigible craft movable about an axis subject to changeable load conditions; automatic pilot means for the craft including a servomotor operable to move the craft about the axis, and means for computing the actual performance of the craft in the system providing a signal for operating said servomotor; means responsive to the output of said servomotor providing a signal in accordance with a performance standard for the craft in the control system for a particular load condition thereof, means for comparing a signal in accordance with the signal of said computing means with the signal of said performance standard means to provide a monitoring output, and means operated by the monitoring output of said comparing means for modifying the signal of said computing means to maintain the performance standard for the craft in the control system for other load conditions thereof.

2. A system as claimed in claim 1, in which said performance standard signal means includes an electrical network that simulates the operating characteristics of the craft in the control system for the particular load condition of the craft.

3. A control system including an automatically piloted aircraft movable about an axis subject to changeable load conditions; automatic pilot means for the aircraft including a servomotor operable to move the aircraft about the axis, means for computing the actual performance of the aircraft in the system providing a signal for operating said servomotor; means responsive to the output of said servomotor providing a signal in accordance with a performance standard for the aircraft in the control system for a particular load condition thereof, means for comparing the signal of said computing means with the signal of said performance standard means to provide a monitoring output, and means operated by the monitoring output of said comparing means for modifying the signal of said computing means to maintain the performance standard for the aircraft in the control system for other load conditions thereof.

4. A system as claimed in claim 3, in which said performance standard signal means includes an electrical network that simulates the operating characteristics of the aircraft in the control system for the particular load condition of the aircraft.

5. A control system including an automatically piloted dirigible craft movable about an axis subject to changeable load conditions; automatic pilot means for the craft including a servomotor operable to move the craft about the axis, computing means for operating said servomotor in accordance with the actual performance of the craft in the system including means providing an output in accordance with the angular displacement of the craft from a reference condition about the axis, means providing an output in accordance with the angular velocity of the craft about the axis, and means providing a repeatback output from the servomotor; means responsive to the servomotor providing an output in accordance with a performance standard for the craft in the control system for a particular load condition thereof, means for comparing the servomotor operating output of said computing means with the output of said performance standard means to provide a monitoring output, and means operated by the monitoring output of said comparing means for modifying the servomotor operating output of said computing means to maintain the performance standard for the craft in the control system for other load conditions thereof.

6. A system as claimed in claim 5, in which the modifying means operatively connects the comparing means and the displacement and repeatback output means of said computing means.

7. The system as claimed in claim 5, in which the modifying means operatively connects the comparing means and the angular velocity output means of said computing means.

8. A control system including an automatically piloted aircraft movable about an axis subject to changeable load conditions; automatic pilot means for the aircraft including a servomotor operable to move the aircraft about the axis, computing means for operating said servomotor in accordance with the actual performance of the aircraft in the system including means providing an output in accordance with the angular displacement of the aircraft from a reference condition about the axis, means providing an output in accordance with the angular velocity of the aircraft about the axis, and means providing a repeatback output from the servomotor; means responsive to the output of the servomotor providing a signal in accordance with a performance standard for the aircraft in the control system for a particular load condition thereof, means for comparing the servomotor operating output of said computing means with the signal of said performance standard means to provide a monitoring output, and means operated by the monitoring output of said comparing means for modifying the servomotor operating output of said computing means to maintain the performance standard for the aircraft in the control system for other load conditions thereof.

9. A system as claimed in claim 8, in which the modifying means operatively connects the comparing means and the displacement and repeatback output means of said computing means.

10. A system as claimed in claim 8, in which the modifying means operatively connects the comparing means and the angular velocity output means of said computing means.

References Cited in the file of this patent

UNITED STATES PATENTS

| | | |
|---|---|---|
| 2,414,430 | Nisbet | Jan. 14, 1947 |
| 2,466,035 | McCoy | Apr. 5, 1949 |
| 2,537,083 | Peoples | Jan. 9, 1951 |
| 2,545,343 | Conviser | Mar. 13, 1951 |
| 2,654,999 | Berge | Oct. 13, 1953 |